July 21, 1925.
S. G. DOWN
AUTOMOTIVE BRAKE DEVICE
Filed Sept. 22, 1922
1,546,481
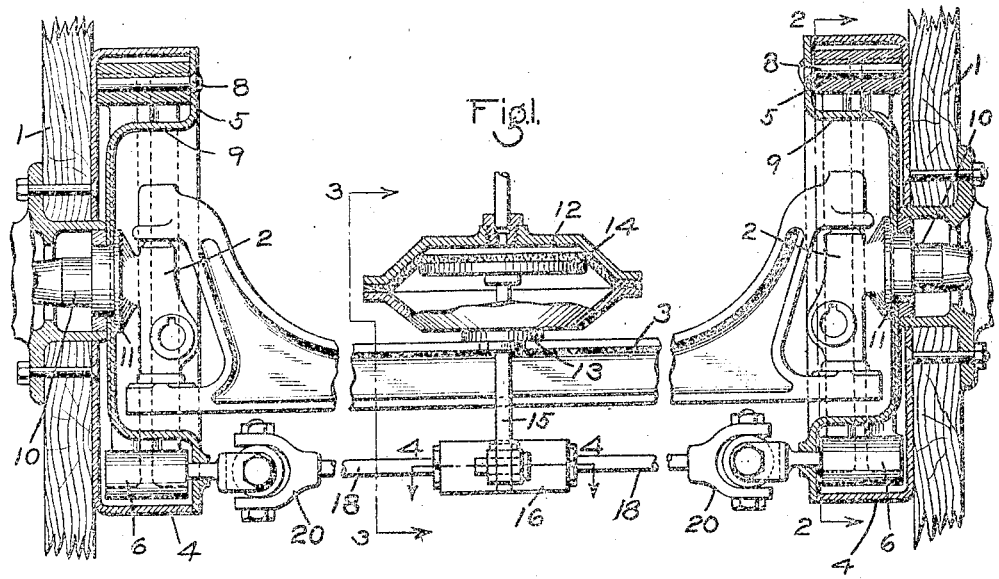
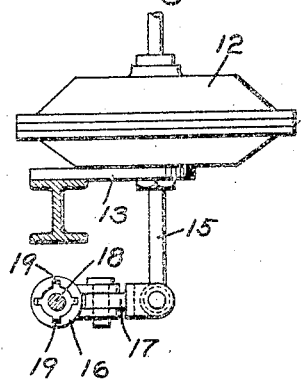
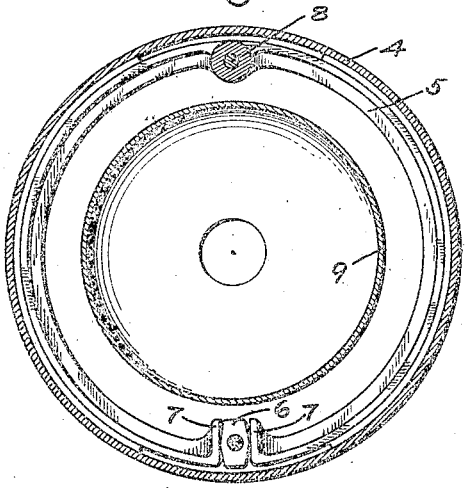
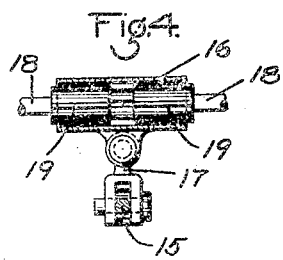
INVENTOR
SIDNEY G. DOWN
BY *Wm. M. Cady*
ATTORNEY Patented July 21, 1925.

1,546,481

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed September 22, 1922. Serial No. 589,762.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Brake Devices, of which the following is a specification.

This invention relates to automotive brakes, and more particularly to a fluid pressure brake construction adapted for application to the front wheels of a motor vehicle.

The principal object of my invention is to provide an improved motor vehicle brake of the above character.

In the accompanying drawing; Fig. 1 is an elevational view, partly in section, of a brake mechanism embodying my invention and applied to the front wheel portion of a motor vehicle; Fig. 2 a section on the line 2—2 of Fig. 1; Fig. 3 a section on the line 3—3 of Fig. 1; and Fig. 4 a section on the line 4—4 of Fig. 1.

In Fig. 1 is shown in section a portion 1 of a front wheel of a vehicle, the wheel being carried by the usual steering knuckle 2 which is pivotally mounted in the usual front axle 3. Secured to the wheel 1 is a brake drum 4 and mounted in said drum is a non-rotatable brake member 5 adapted to be expanded so as to frictionally engage the interior face of the drum 4 by the rotation of a cam 6 interposed between the adjacent ends 7 of the brake member 5. The brake member 5 is non-rotatably supported on a pin 8 which is secured to a cover plate 9, said plate being centrally cupped and having a central opening for receiving the wheel bearing pin 10. The plate 9 is secured to the pin 10, adjacent to the flange portion 11, by brazing or otherwise.

For operating the brake by fluid under pressure, a brake chamber 12 is carried by the axle 3, being secured to a supporting member 13, which is mounted centrally on the axle. The brake chamber 12 contains a flexible diaphragm 14 for operating a push rod 15 when fluid under pressure is supplied to the diaphragm.

Preferably, as shown in the drawing, a single brake chamber is employed for operating the brakes of both front wheels, although, if desired, a separate brake cylinder may be employed for each front wheel brake. When a single brake chamber is employed, a sleeve member 16 may be provided, having a hinged connection to an arm 17 which is pivotally connected to the push rod 15. Operating rods 18 extend in opposite directions from the sleeve 16, one end of each rod being slidably mounted in the sleeve and having splines 19 adapted to engage corresponding slots in the sleeve, so that the rods 18 may be rotated by the rotation of the sleeve while permitting relative longitudinal movement of the rods.

Each rod 18 is operatively connected through a universal joint 20 to the cam 6 of the corresponding front wheel brake member, so that rotation of the rod 18 operates to rotate the cam 6.

When fluid under pressure is supplied to the brake chamber 12, the diaphragm 14 operates to project the push rod 15, so that the sleeve member 16 is rocked by the arm 17 and thereby the rods 18 are partly rotated to cause the cams 6 to act on the ends 7 of the brake member 5, the brake member being thereby expanded to frictionally engage the drum 4 and thus cause the brakes to be applied.

The universal joints 20 provide for movement of the front wheels when the wheels are turned with the steering knuckles in steering, while angular and relative longitudinal movement of the rods 18 is provided for by the hinged connection of the sleeve 16 to the arm 17 and the sliding connection of the rods 18 in the sleeve 16.

Having now described my invention, what I claim as new and desire to secure by Letters Patent, is:—

1. In a motor vehicle brake, the combination with a pair of front wheels of a motor vehicle and an axle for said wheels, of cooperating brake members associated with each wheel, a brake chamber mounted on said axle, a movable abutment in said chamber, and means for operatively connecting said abutment to a brake member of each wheel.

2. In a motor vehicle brake, the combination with a pair of front wheels of a motor vehicle and an axle for said wheels, of cooperating brake members associated with each wheel, a brake chamber mounted on said axle, a movable abutment in said chamber, rods operatively connecting said abutment to a brake member of each wheel, and means for permitting relative angular and longitudinal sliding movement of the rods with respect to said brake chamber.

3. In a motor vehicle brake, the combination with a pair of front wheels of a motor vehicle and an axle for said wheels, of co-operating brake members associated with each wheel, a brake chamber mounted on said axle, a movable abutment in said chamber, rods operatively connecting said abutment to a brake member of each wheel, a universal joint in each rod, and means for permitting relative angular and longitudinal sliding movement of the rods with respect to said brake chamber.

In testimony whereof I have hereunto set my hand.

SIDNEY G. DOWN.